US012730097B2

(12) United States Patent
Burton

(10) Patent No.: US 12,730,097 B2
(45) Date of Patent: Sep. 8, 2026

(54) COMPOUND IDENTIFICATION BY MASS SPECTROMETRY

(71) Applicant: DH TECHNOLOGIES DEVELOPMENT PTE. LTD., Singapore (SG)

(72) Inventor: Lyle Lorrence Burton, Woodbridge (CA)

(73) Assignee: DH Technologies Development Pte. Ltd., Singapore (SG)

( * ) Notice: Subject to any disclaimer, the term of this patent is extended or adjusted under 35 U.S.C. 154(b) by 536 days.

(21) Appl. No.: 18/250,821

(22) PCT Filed: Oct. 30, 2021

(86) PCT No.: PCT/IB2021/060073
§ 371 (c)(1),
(2) Date: Apr. 27, 2023

(87) PCT Pub. No.: WO2022/091047
PCT Pub. Date: May 5, 2022

(65) Prior Publication Data

US 2023/0393107 A1 Dec. 7, 2023

Related U.S. Application Data

(60) Provisional application No. 63/107,911, filed on Oct. 30, 2020.

(51) Int. Cl.
*G01N 30/86* (2006.01)
*G01N 30/72* (2006.01)

(52) U.S. Cl.
CPC ......... *G01N 30/8631* (2013.01); *G01N 30/72* (2013.01); *G01N 30/8644* (2013.01)

(58) Field of Classification Search
None
See application file for complete search history.

(56) References Cited

U.S. PATENT DOCUMENTS 9,582,909 B2 2/2017 Kawana
2009/0065686 A1 3/2009 Shilov et al.
(Continued)

FOREIGN PATENT DOCUMENTS

CN 107066789 8/2017
JP 6036304 B2 11/2016

OTHER PUBLICATIONS

Owlstone Medical, "Peak Fitting", 2013 https://www.owlstonemedical.com/media/uploads/files/04PeakFitting.pdf (Year: 2013).*
(Continued)

*Primary Examiner* — Lina Cordero
(74) *Attorney, Agent, or Firm* — Lathrop GPM LLP; Malaika O.D. Tyson; Jason Kuchar

(57) ABSTRACT

Mass spectra are received over time for a compound of interest. A primary XIC is calculated for a primary product ion of the compound and a secondary XIC is calculated for a secondary product ion from the mass spectra. A primary value is calculated from a combination of intensities of one or more points corresponding to one or more times of a primary peak of the primary XIC and a secondary value is calculated from a combination of intensities of one or more points corresponding to the one or more times of a secondary peak of the secondary XIC. Or, the primary value is calculated as an area of a time window within the primary peak and the secondary value is calculated as an area of the time window within the secondary peak. A ratio is calculated from the primary value and the secondary value.

20 Claims, 8 Drawing Sheets

(56) References Cited

U.S. PATENT DOCUMENTS

| | | | | |
|---|---|---|---|---|
| 2012/0158318 | A1* | 6/2012 | Wright | G01N 15/02 702/28 |
| 2013/0240727 | A1* | 9/2013 | Sumiyoshi | H01J 49/02 250/288 |
| 2018/0166265 | A1* | 6/2018 | Geromanos | H01J 49/0031 |
| 2018/0321201 | A1* | 11/2018 | Taneda | G01N 30/8679 |
| 2020/0096489 | A1 | 3/2020 | Isosev et al. | |
| 2020/0110064 | A1* | 4/2020 | Sugimoto | G01N 30/8651 |
| 2020/0279725 | A1 | 9/2020 | Le Blanc | |

OTHER PUBLICATIONS

International Search Report and Written Opinion for PCT/IB2021/060073, mailed Jan. 2, 2022.

Tinshaw John V.: "How Do Your Peaks Measure Up?" LCGC Europe, (Online) vol. 26, No. 10, Oct. 1, 2013, pp. 575-582, XP055882221, URL: https://www.chromatographyonline.com/view/how-do-your-peaks-measure>.

Snyder Lloyd R. et al. "Qualitative and Quantitative Analysis" In: "Introduction to Modern Liquid Chromatography," Jan. 1, 2009, John Wiley, XP055882237, vol. 520, p. 499-529, p. 501, figure 11.1, p. 504, figure 11.4.

China National Intellectual Property Administration, Office Action for Application No. 202180069185.X, dated Feb. 28, 2026. English translation included.

* cited by examiner

| Approach | Average Ion Ratio | Ion Ratio Standard Deviation |
|---|---|---|
| Integrated Peak Area | 1.03 | 0.103 |
| Intensity Sum – 1 Point | 1.02 | 0.132 |
| Intensity Sum – 3 Points | 1.01 | 0.076 |
| Intensity Sum – 5 Points | 1.01 | 0.063 |
| Intensity Sum – 7 Points | 1.01 | 0.055 |

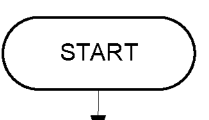

SEPARATE AND FRAGMENT OR ONLY SEPARATE A COMPOUND OF INTEREST FROM A SAMPLE AT A PLURALITY OF DIFFERENT TIMES USING A SEPARATION DEVICE

710

IONIZE SEPARATED FRAGMENTS OF THE COMPOUND OR ONLY THE COMPOUND USING AN ION SOURCE DEVICE, PRODUCING AN ION BEAM

720

MASS ANALYZE PRODUCT IONS OF THE COMPOUND FROM THE ION BEAM OR SELECT AND FRAGMENT THE COMPOUND FROM THE ION BEAM AND MASS ANALYZE PRODUCT IONS OF THE COMPOUND AT THE PLURALITY OF DIFFERENT TIMES USING A MASS SPECTROMETER, PRODUCING A PLURALITY OF MASS SPECTRA FOR THE COMPOUND

730

CALCULATE A PRIMARY XIC FOR A PRIMARY PRODUCT ION OF THE COMPOUND AND CALCULATE A SECONDARY XIC FOR A SECONDARY PRODUCT ION OF THE COMPOUND FROM THE PLURALITY OF MASS SPECTRA USING A PROCESSOR

740

CALCULATE A PRIMARY VALUE FROM A COMBINATION OF INTENSITIES OF ONE OR MORE POINTS CORRESPONDING TO ONE OR MORE TIMES, BUT FEWER THAN ALL OF THE POINTS, OF A PRIMARY PEAK OF THE PRIMARY XIC AND CALCULATE A SECONDARY VALUE FROM A COMBINATION OF INTENSITIES OF ONE OR MORE POINTS CORRESPONDING TO THE ONE OR MORE TIMES OF A SECONDARY PEAK OF THE SECONDARY XIC USING THE PROCESSOR OR CALCULATE THE PRIMARY VALUE AS AN AREA OF A TIME WINDOW WITHIN THE PRIMARY PEAK THAT IS LESS THAN A PEAK WIDTH OF THE PRIMARY PEAK AND CALCULATE THE SECONDARY VALUE AS AN AREA OF THE TIME WINDOW WITHIN THE SECONDARY PEAK USING THE PROCESSOR

750

CALCULATE A RATIO FROM THE PRIMARY VALUE AND THE SECONDARY VALUE USING THE PROCESSOR

760

END

FIG. 7

COMPOUND IDENTIFICATION BY MASS SPECTROMETRY

RELATED US APPLICATIONS

The present application claims the benefit of priority from U.S. Provisional Application No. 63/107,911, filed on Oct. 30, 2020, the entire contents of which is incorporated by reference herein.

INTRODUCTION

The teachings herein relate to operating a separation device and mass spectrometer to identify one or more compounds of interest.

Primary To Secondary Peak Ratio

Liquid chromatography (LC) is a well-known technique used to separate and analyze compounds from a sample mixture. LC is often coupled with mass spectrometry (LC-MS) or tandem mass spectrometry (LC-MS/MS). As described below, the series of mass spectra produced from LC-MS or LC-MS/MS over time form a chromatogram. A chromatogram produced for a compound of interest is referred to as an extracted ion chromatogram (XIC), for example.

Chromatograms and XICs include one or more chromatographic peaks. These peaks are intensity versus retention time peaks, where the retention time refers to the time of separation from the LC. LC-MS or LC-MS/MS peaks are used to identify or quantify the compounds in the sample mixture. Compounds are quantified or quantitated by calculating the area of a peak. This calculation of the area of a peak is often referred to as peak integration.

When performing LC-MS or LC-MS/MS quantification, in many application areas, ion ratios are calculated and reported to confirm that the correct LC peak was integrated and that it is relatively free of interferences. An ion ratio is the ratio of the integrated LC peak for the primary or quantifier peak to that of a secondary or qualifier peak for the same compound. XICs are acquired for a primary ion and one or more secondary ions using multiple reaction monitoring (MRM) scans, scheduled MRM scans, or triggered MRM scans, for example. These MRM methods are described below.

If the ion ratio for a particular sample matches the expected value, this confirms that the reported result is likely to be accurate and corresponds to the correct compound. Note that the expected value is usually determined experimentally from an authentic standard. Ion ratios are very commonly calculated and work well. They are also essential to many workflows including clinical applications and environmental screening applications. An exemplary clinical application includes, but is not limited to, determining the concentration of a certain vitamin in a blood sample. An exemplary environmental screening application includes, but is not limited to, screening samples from a shipment of vegetables for a large number of possible pesticides.

Unfortunately, however, conventional methods of calculating ion ratios can present at least two challenges or problems for LC-MS or LC-MS/MS. First, calculating ion ratios can double or triple the number of chromatographic peaks that need to be manually reviewed. Manual review is doubled when just one secondary ion is analyzed and tripled when two secondary ions are analyzed, for example. These manual reviews, in turn, produce a corresponding increase in the number of peaks with problematic integrations that need to be manually corrected. Features such as "review by exception" and improvements to core peak finding algorithms can reduce this burden, but the review and correction process is currently still labor-intensive. In other words, calculating ion ratios can significantly increase the amount of time needed to manually analyze and correct LC-MS or LC-MS/MS data.

Second, the conventional methods limit the number of compounds of interest that can be monitored at the same time as the mass spectrometer continuously monitors both the primary ion and secondary ion(s) for each compound of interest. New methods of performing LC-MS or LC-MS/MS analysis, for example using triggered MRM scans, increase the number of compounds that can be monitored in screening experiments by continuously monitoring only for the primary ion for each compound of interest and then switching to acquire a secondary transition when the primary is above a specified threshold. In this case, however, if the triggering threshold is set too high, it is not possible to obtain the entire chromatographic peak of the secondary ion. As a result, integration of the peak of the secondary ion is likely to be highly inaccurate also reducing the accuracy of the ion ratio such that an incorrect ion ratio may be reported. As a result, it is customary to set a very low trigger threshold to ensure a complete peak of the secondary ion is captured. Unfortunately a low trigger threshold results in a higher number of false positives, where the measured intensity for the primary ion is above the threshold but not as a result of actually detecting the primary ion. This can slow the duty cycle of the instrument, and defeat the purpose of only monitoring for primary ions.

FIG. 2 is an exemplary plot 200 of XICs for primary and secondary ions showing how the triggering of MRMs for a secondary ion by an MRM of a primary ion can result in an incomplete chromatographic peak for the secondary ion, upon which various embodiments may be implemented. XIC 210 of the primary ion includes primary peak 211. When an intensity 212 of the primary ion is detected above threshold intensity 213, MRMs for a secondary ion are triggered, producing XIC 220 of the secondary ion. XIC 220 of the secondary ion includes secondary peak 221.

On comparison with primary peak 211, secondary peak 221 does not have a similar peak shape. More specifically, because the MRMs for the secondary ion are started after the leading edge of primary peak 211 has already begun, points from the leading edge of secondary peak 221 are missing. Because points of the leading edge of secondary peak 221 are missing, the integration of secondary peak 221 will be inaccurate and any ratio calculated from the integration of secondary peak 221 will be inaccurate as well.

As a result, additional systems and methods are needed to calculate ion ratios that decrease the amount of time needed to manually analyze and correct LC-MS or LC-MS/MS data and that can be used with new methods of performing LC-MS or LC-MS/MS, such as triggered MRM.

Mass Spectrometry Background

As described above, mass spectrometers are often coupled with separation devices, such as chromatography devices, in order to identify and characterize compounds of interest from a sample or to analyze multiple samples. In such a coupled system, the eluting or injected solvent is ionized and a series of mass spectra are obtained from the eluting solvent at specified time intervals called retention times. These retention times range from, for example, 1 second to 100 minutes or greater. The series of mass spectra form a chromatogram, or extracted ion chromatogram (XIC).

Peaks found in the XIC are used to identify or characterize a known peptide or compound in a sample, for example.

More particularly, the retention times of peaks and/or the area of peaks are used to identify or characterize (quantify) a known peptide or compound in the sample. In the case of multiple samples provided over time by a sample introduction device, the retention times of peaks are used to align the peaks with the correct sample.

In traditional separation coupled mass spectrometry systems, a fragment or product ion of a known compound is selected for analysis. A tandem mass spectrometry or mass spectrometry/mass spectrometry (MS/MS) scan is then performed at each interval of the separation for a mass range that includes the production. The intensity of the product ion found in each MS/MS scan is collected over time and analyzed as a collection of spectra, or an XIC, for example.

In general, tandem mass spectrometry, or MS/MS, is a well-known technique for analyzing compounds. Tandem mass spectrometry involves ionization of one or more compounds from a sample, selection of one or more precursor ions of the one or more compounds, fragmentation of the one or more precursor ions into fragment or product ions, and mass analysis of the product ions.

Tandem mass spectrometry can provide both qualitative and quantitative information. The product ion spectrum can be used to identify a molecule of interest. The intensity of one or more product ions can be used to quantitate the amount of the compound present in a sample.

A large number of different types of experimental methods or workflows can be performed using a tandem mass spectrometer. Three broad categories of these workflows are targeted acquisition, information dependent acquisition (IDA) or data-dependent acquisition (DDA), and data-independent acquisition (DIA).

In a targeted acquisition method, one or more transitions of a precursor ion to a product ion are predefined for a compound of interest. As a sample is being introduced into the tandem mass spectrometer, the one or more transitions are interrogated or monitored during each time period or cycle of a plurality of time periods or cycles. In other words, the mass spectrometer selects and fragments the precursor ion of each transition and performs a targeted mass analysis only for the production of the transition. As a result, an intensity (a product ion intensity) is produced for each transition. Targeted acquisition methods include, but are not limited to, multiple reaction monitoring (MRM) and selected reaction monitoring (SRM).

In a targeted acquisition method, a list of transitions is typically interrogated during each cycle time. In order to decrease the number of transitions that are interrogated at any one time, some targeted acquisition methods have been modified to include a retention time or a retention time range for each transition. Only at that retention time or within that retention time range will that particular transition be interrogated. One targeted acquisition method that allows retention times to be specified with transitions is referred to as scheduled MRM.

In scheduled MRM, each MRM transition to be analyzed during the experiment is also assigned a retention time or retention time range. During the experiment, MRM transitions are then added to and removed from a list of transitions to be executed during each cycle of the tandem mass spectrometer based on their retention time or retention time range. In this way, the number of transitions being executed during any one cycle is reduced.

Unfortunately, however, in some instances, compounds of interest may not separate from a sample at the retention times specified in a scheduled MRM experiment. For example, the scheduled MRM experiment may be performed by a different laboratory or under different experimental conditions. In addition, scheduled MRM is dependent on the accuracy and absolute value of the retention time used for each transition.

As a result, a method for triggering MRM transitions that is not based on retention time was developed. In this method, one MRM transition is used to trigger one or more other MRM transitions to be analyzed. This MRM method is referred to as triggered MRM.

In an IDA method, a user can specify criteria for performing an untargeted mass analysis of product ions, while a sample is being introduced into the tandem mass spectrometer. For example, in an IDA method, a precursor ion or mass spectrometry (MS) survey scan is performed to generate a precursor ion peak list. The user can select criteria to filter the peak list for a subset of the precursor ions on the peak list. MS/MS is then performed on each precursor ion of the subset of precursor ions. A product ion spectrum is produced for each precursor ion. MS/MS is repeatedly performed on the precursor ions of the subset of precursor ions as the sample is being introduced into the tandem mass spectrometer.

In proteomics and many other sample types, however, the complexity and dynamic range of compounds are very large. This poses challenges for traditional targeted and IDA methods, requiring very high-speed MS/MS acquisition to deeply interrogate the sample in order to both identify and quantify a broad range of analytes.

As a result, DIA methods, the third broad category of tandem mass spectrometry, were developed. These DIA methods have been used to increase the reproducibility and comprehensiveness of data collection from complex samples. DIA methods can also be called non-specific fragmentation methods. In a traditional DIA method, the actions of the tandem mass spectrometer are not varied among MS/MS scans based on data acquired in a previous precursor or product ion scan. Instead, a precursor ion mass range is selected. A precursor ion mass selection window is then stepped across the precursor ion mass range. All precursor ions in the precursor ion mass selection window are fragmented and all of the product ions of all of the precursor ions in the precursor ion mass selection window are mass analyzed.

The precursor ion mass selection window used to scan the mass range can be very narrow so that the likelihood of multiple precursors within the window is small. This type of DIA method is called, for example, $MS/MS^{ALL}$. In an $MS/MS^{ALL}$ method, a precursor ion mass selection window of about 1 amu is scanned or stepped across an entire mass range. A product ion spectrum is produced for each 1 amu precursor mass window. The time it takes to analyze or scan the entire mass range once is referred to as one scan cycle. Scanning a narrow precursor ion mass selection window across a wide precursor ion mass range during each cycle, however, is not practical for some instruments and experiments.

As a result, a larger precursor ion mass selection window, or selection window with a greater width, is stepped across the entire precursor mass range. This type of DIA method is called, for example, SWATH acquisition. In a SWATH acquisition, the precursor ion mass selection window stepped across the precursor mass range in each cycle may have a width of 5-25 amu, or even larger. Like the $MS/MS^{ALL}$ method, all the precursor ions in each precursor ion mass selection window are fragmented, and all of the product ions of all of the precursor ions in each mass selection window are mass analyzed.

SUMMARY

The present application relates to systems and methods for identifying a compound of interest by mass spectrometry. More specifically, in some embodiments, systems and methods are provided to calculate the ratio of the sum or average intensity of one or more points of a primary chromatographic peak to the sum or average intensity of one or more corresponding points of a secondary chromatographic peak. Additionally, systems and methods are provided to calculate the ratio of the area of a time window within the primary peak to the area of the same time window within the secondary peak.

The system and methods disclosed herein can be performed in conjunction with a processor, controller, microcontroller, or computer system, such as the computer system of FIG. 1.

A system, method, and computer program product are disclosed for calculating a ratio of a chromatographic peak of a primary ion of a compound of interest to a chromatographic peak of a secondary ion. The system may include a separation device, an ion source device, a mass spectrometer, and a processor.

The separation device separates and fragments or only separates a compound of interest from a sample at a plurality of different times. The ion source device ionizes separated fragments of the compound or only the compound, producing an ion beam. The mass spectrometer mass analyzes product ions of the compound or selects and fragments the compound and mass analyzes product ions of the compound from the ion beam at the plurality of different times. A plurality of mass spectra is produced for the compound.

The processor may calculate a primary XIC for a primary product ion of the compound and calculate a secondary XIC for a secondary product ion of the compound using the plurality of mass spectra. In a first method, the processor may calculate a primary value from a combination of intensities of one or more points corresponding to one or more times, but fewer than all of the points, of a primary peak of the primary XIC and calculates a secondary value from a combination of intensities of one or more points corresponding to the one or more times of a secondary peak of the secondary XIC. Or, in a second method, the processor may calculate the primary value as an area of a time window within the primary peak that is less than a peak width of the primary peak and calculate the secondary value as an area of the time window within the secondary peak. The processor may then calculate a ratio from the primary value and the secondary value.

These and other features of the applicant's teachings are set forth herein.

BRIEF DESCRIPTION OF THE DRAWINGS

The skilled artisan will understand that the drawings, described below, are for illustration purposes only. The drawings are not intended to limit the scope of the present teachings in any way.

FIG. 7 is a flowchart showing a method for calculating a ratio of a chromatographic peak of a primary ion of a compound of interest to a chromatographic peak of a secondary ion, in accordance with various embodiments.

Figure 1:
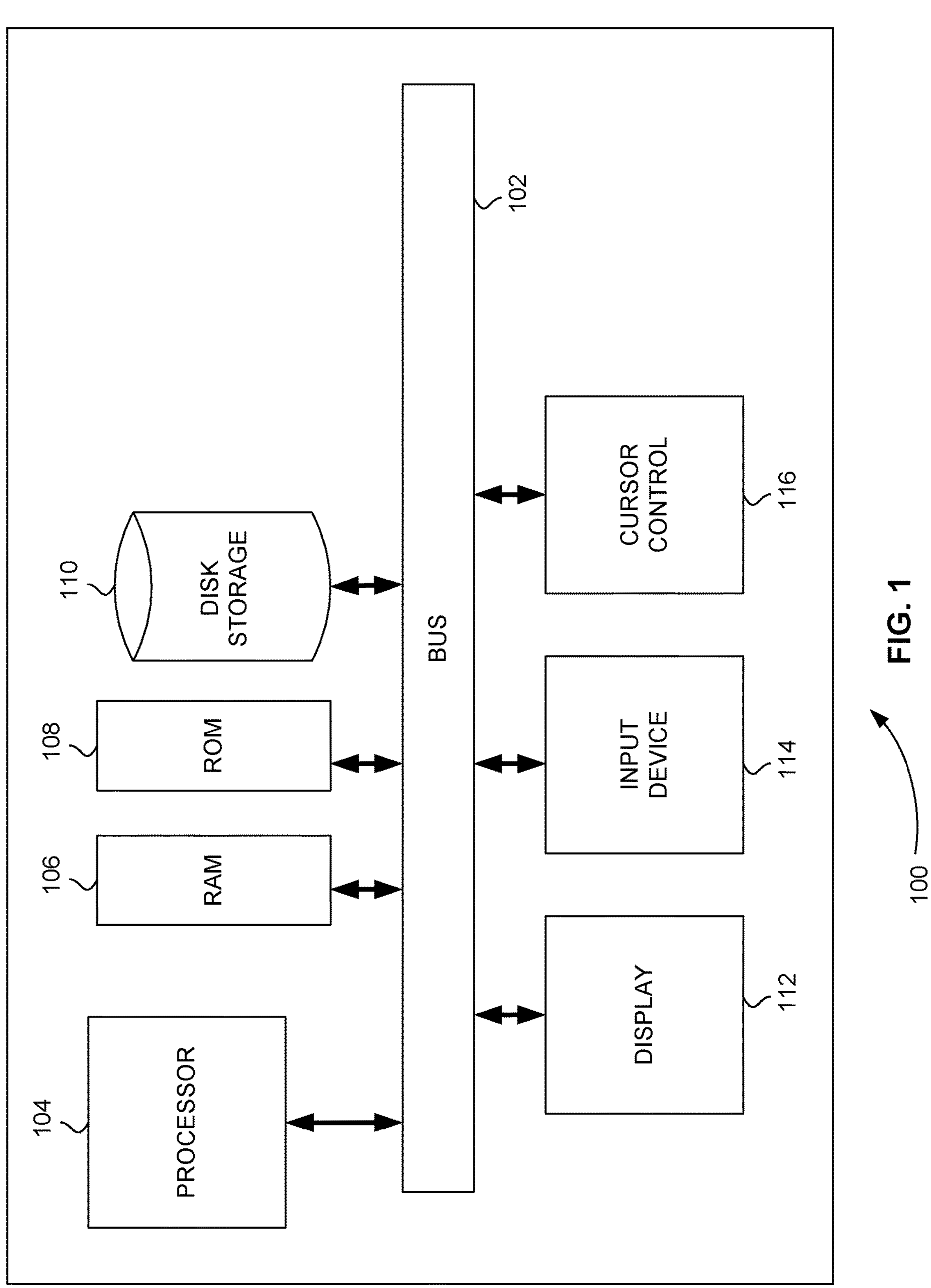
FIG. 1 is a block diagram that illustrates a computer system, upon which embodiments of the present teachings may be implemented.

Before one or more embodiments of the present teachings are described in detail, one skilled in the art will appreciate that the present teachings are not limited in their application to the details of construction, the arrangements of components, and the arrangement of steps set forth in the following detailed description or illustrated in the drawings. Also, it is to be understood that the phraseology and terminology used herein is for the purpose of description and should not be regarded as limiting.

DESCRIPTION OF VARIOUS EMBODIMENTS

Computer-Implemented System

FIG. 1 is a block diagram that illustrates a computer system 100, upon which embodiments of the present teachings may be implemented. Computer system 100 includes a bus 102 or other communication mechanism for communicating information, and a processor 104 coupled with bus 102 for processing information. Computer system 100 also includes a memory 106, which can be a random-access memory (RAM) or other dynamic storage device, coupled to bus 102 for storing instructions to be executed by processor 104. Memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT) or liquid crystal display (LCD), for displaying information to a computer user. An input device 114, including alphanumeric and other keys, is coupled to bus 102 for communicating information and command selections to processor 104. Another type of user input device is cursor control 116, such as a mouse, a trackball or cursor direction keys for communicating direction information and command selections to processor 104 and for controlling cursor movement on display 112. This input device typically has two degrees of freedom in two axes, a first axis (i.e., x) and a second axis (i.e., y), that allows the device to specify positions in a plane.

A computer system 100 can perform the present teachings. Consistent with certain implementations of the present teachings, results are provided by computer system 100 in response to processor 104 executing one or more sequences of one or more instructions contained in memory 106. Such instructions may be read into memory 106 from another computer-readable medium, such as storage device 110. Execution of the sequences of instructions contained in memory 106 causes processor 104 to perform the process described herein. Alternatively, hard-wired circuitry may be used in place of or in combination with software instructions to implement the present teachings. Thus, implementations of the present teachings are not limited to any specific combination of hardware circuitry and software.

In various embodiments, computer system 100 can be connected to one or more other computer systems, like computer system 100, across a network to form a networked system. The network can include a private network or a public network such as the Internet. In the networked system, one or more computer systems can store and serve the data to other computer systems. The one or more computer systems that store and serve the data can be referred to as servers or the cloud, in a cloud computing scenario. The one or more computer systems can include one or more web servers, for example. The other computer systems that send and receive data to and from the servers or the cloud can be referred to as client or cloud devices, for example.

The term "computer-readable medium" as used herein refers to any media that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as memory 106. Transmission media includes coaxial cables, copper wire, and fiber optics, including the wires that comprise bus 102.

Common forms of computer-readable media or computer program products include, for example, a floppy disk, a flexible disk, hard disk, magnetic tape, or any other magnetic medium, a CD-ROM, digital video disc (DVD), a Blu-ray Disc, any other optical medium, a thumb drive, a memory card, a RAM, PROM, and EPROM, a FLASH-EPROM, any other memory chip or cartridge, or any other tangible medium from which a computer can read.

Various forms of computer readable media may be involved in carrying one or more sequences of one or more instructions to processor 104 for execution. For example, the instructions may initially be carried on the magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector coupled to bus 102 can receive the data carried in the infra-red signal and place the data on bus 102. Bus 102 carries the data to memory 106, from which processor 104 retrieves and executes the instructions. The instructions received by memory 106 may optionally be stored on storage device 110 either before or after execution by processor 104.

In accordance with various embodiments, instructions configured to be executed by a processor to perform a method are stored on a computer-readable medium. The computer-readable medium can be a device that stores digital information. For example, a computer-readable medium includes a compact disc read-only memory (CD-ROM) as is known in the art for storing software. The computer-readable medium is accessed by a processor suitable for executing instructions configured to be executed.

The following descriptions of various implementations of the present teachings have been presented for purposes of illustration and description. It is not exhaustive and does not limit the present teachings to the precise form disclosed. Modifications and variations are possible in light of the above teachings or may be acquired from practicing of the present teachings. Additionally, the described implementation includes software but the present teachings may be implemented as a combination of hardware and software or in hardware alone. The present teachings may be implemented with both object-oriented and non-object-oriented programming systems.

Ion Ratios from a Few Points or a Narrow Time Window

As described above, when performing LC-MS or LC-MS/MS quantification, in many application areas, ion ratios are calculated and reported to confirm that the correct LC peak was integrated and that it is relatively free of interferences. An ion ratio is the ratio of the integrated LC peak for the primary or quantifier peak to that of a secondary or qualifier peak for the same compound. In the present application the term "primary ion" refers to a representative or target ion of interest. In some embodiments, the primary ion may be the highest intensity fragment or product ion produced after fragmentation. In other cases the "primary ion" may comprise a fragment or fragment ion of interest that has a lower intensity than the highest intensity product ion. The term "secondary ion" refers to one or more confirmation ions that provide additional confirmation or confidence that an expected precursor ion produced the fragment or daughter ions including the primary ion and secondary ion(s).

The purpose of evaluating the ion ratio is to confirm the expected relative presence of the primary ions and the secondary ions that provides further confidence that the expected precursor ion produced the primary ions and secondary ions. Accordingly, in combination with other related information such as retention time, mass filter(s), etc., the ion ratio confirms that the expected fragments have been detected.

Embodiments of systems and methods are presented that calculate ion ratios that decrease the amount of time needed to manually analyze and correct LC-MS or LC-MS/MS data and that can be used with new methods of performing LC-MS or LC-MS/MS, such as triggered MRM.

In some embodiments, systems and methods for compound identification may be provided where a mass spectrometer is set to monitor a plurality of primary product ions for an intensity above a pre-determined intensity threshold and, if one of the plurality of primary product ions is detected above the threshold, the mass spectrometer is operative to activate monitoring for one or more different secondary ions. If the mass spectrometer detects the one or more different secondary ions the mass spectrometer is operative to calculate a plurality of ion ratios based on at least the plurality of different secondary ions. In some cases, the mass spectrometer may further calculate at least one of the plurality of ion ratios based on the primary ions.

In various embodiments, an ion ratio is calculated using just a few points of the primary and secondary ion peaks or is calculated using a narrow time window within the primary ion and secondary ion peaks. Both methods do not significantly increase the amount of time needed to manually analyze and correct LC-MS or LC-MS/MS data and that can be used with new methods of performing LC-MS or LC-MS/MS, such as triggered MRM.

In some embodiments a boundary of the time window coincides with a sample point of at least one of the product ions. In some embodiments, a width of the time window is an integer multiple of a sampling interval for at least one of the product ions captured within the window. In some embodiments, a width of the time window may include a same number of sampling points for each of the product ions captured within the window.

Both methods optionally continue to integrate the entire peak area of the primary ion peak to construct a calibration curve to quantitate the compound of interest. However, not using the entire peak area of the secondary ion peak significantly reduces the amount of time needed to manually analyze and correct LC-MS or LC-MS/MS data and enables these methods to be used with new methods of performing LC-MS or LC-MS/MS, such as triggered MRM.

More specifically, in one embodiment, the intensities measured at one or more points (i.e., sampling points) corresponding to one or more retention times across the chromatographic peak of a primary ion are summed or averaged, producing a primary peak value. Similarly, the intensities measured at one or more points corresponding to the same one or more retention times across the chromatographic peak of a secondary ion are summed or averaged, producing a secondary peak value. The primary ion to secondary ion ratio is then calculated as the primary peak value divided by the secondary peak value.

Figure 2:
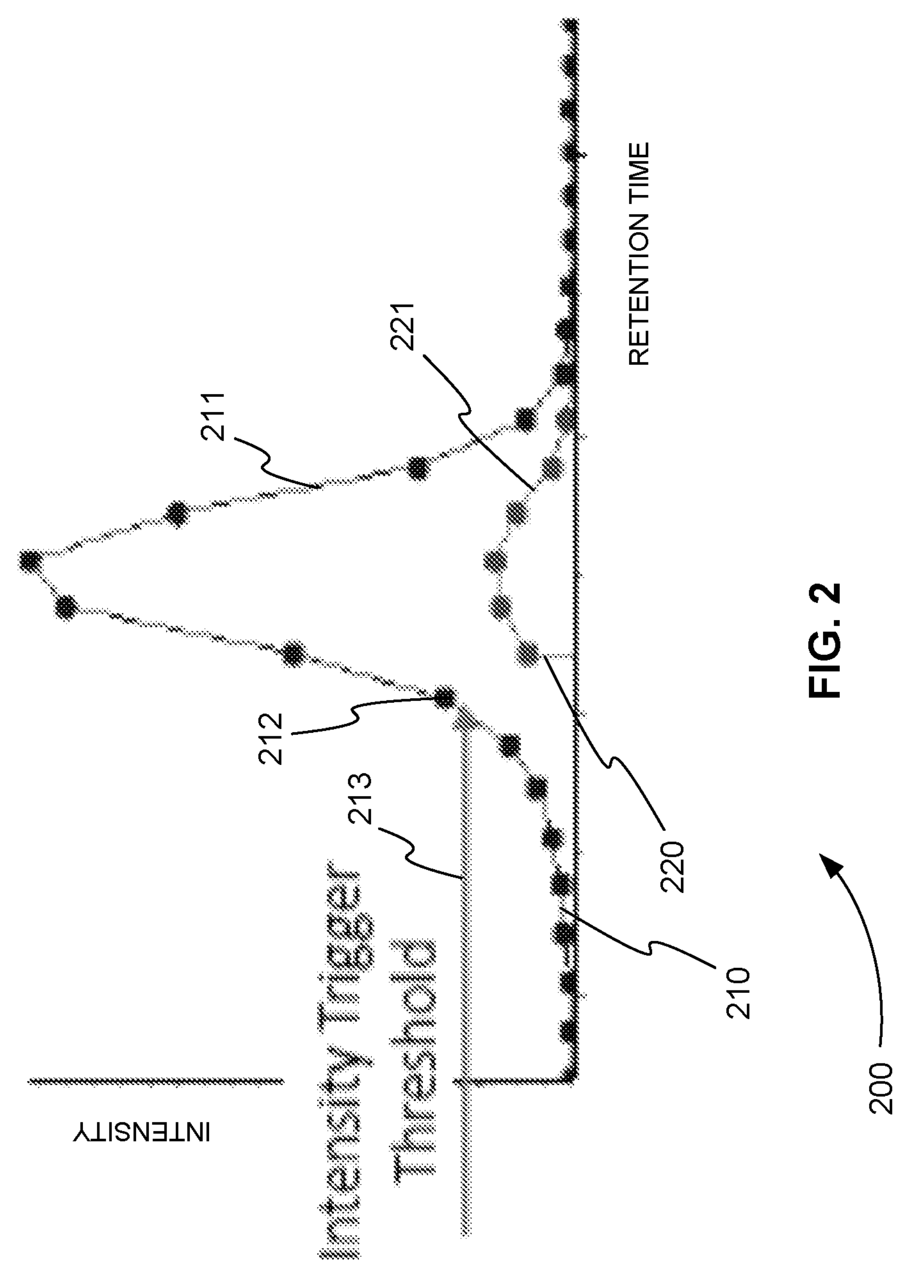
FIG. 2 is an exemplary plot of XICs for primary and secondary ions showing how the triggering of MRMs for a secondary ion by an MRM of a primary ion can result in an incomplete chromatographic peak for the secondary ion, upon which various embodiments may be implemented.
Figure 3:
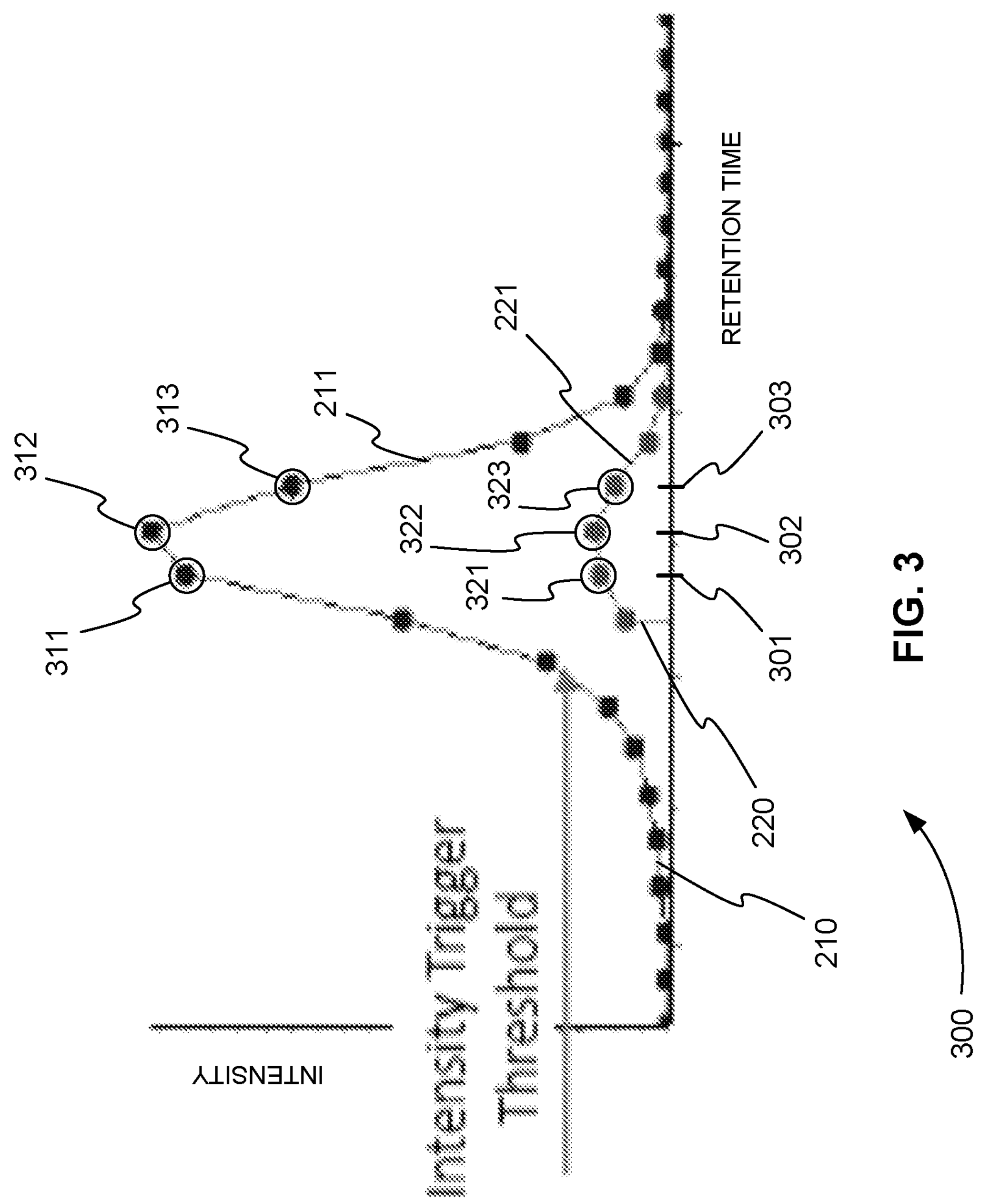
FIG. 3 is an exemplary plot of the XICs of FIG. 2 showing how an ion ratio is calculated using just a few points of the primary and secondary ion peaks, in accordance with various embodiments.

FIG. 3 is an exemplary plot 300 of the XICs of FIG. 2 showing how an ion ratio is calculated using just a few points of the primary and secondary ion peaks, in accordance with various embodiments. FIG. 3 includes XIC 210 of the primary ion and XIC 220 of the secondary ion. Again, XIC 210 of the primary ion includes primary peak 211, and XIC 220 of the secondary ion includes secondary peak 221. Instead of calculating the ratio of the primary ion to the secondary ion from the areas of primary peak 211 and secondary peak 221, this ratio is calculated using intensities at a number of points of each peak.

In a preferred embodiment, the highest intensity points of primary peak 211 are selected. For example, points 311, 312, and 313 of primary peak 211 are selected. The intensities measured at points 311, 312, and 313 corresponding to retention times 301, 302, and 303 across primary peak 211 are summed or averaged, producing a primary peak value Similarly, the intensities measured at points 321, 322, and 323 corresponding to the same retention times 301, 302, and 303 secondary peak 221 are summed or averaged, producing a secondary peak value. The primary ion to secondary ion ratio is then calculated as the primary peak value divided by the secondary peak value.

In various embodiments, points 311, 312, and 313 are selected using a timing window. For example, the timing window used is centered at time 302 of apex point 312 and has a width extending from time 301 to time 303. Points 311, 312, and 313 include apex point 312. In various embodiments, the size of the timing or summing window is user-specified. In various alternative embodiments, the size of the timing or summing window is automatically determined based on the width in points. Note that in this case, each point corresponds to an MRM transition scan or TOF full scan, for example. TOF data does not have an MRM-triggering issue, but can benefit from the minimized user review.

In FIG. 3, both XIC 210 and XIC 220 do not include a baseline offset. In other words, these XICs are not shifted along the y-axis by a baseline intensity offset. In some cases, however, these XIC's can include a baseline offset. As a result, in various embodiments, a baseline offset may be determined from the minimum intensities of each XIC. The baseline offset of primary XIC 210 is then subtracted from the primary peak value and the baseline offset of secondary XIC 220 is then subtracted from the secondary peak value before these values are used to calculate the ratio.

As shown in FIG. 3, there is no need to run a peak finding algorithm on secondary XIC 220. There is also no need to manually review or correct and integration of secondary peak 221. Further, FIG. 3 shows that, for the case of MRM-triggered MRM, selecting just a few points of primary peak 211 near the apex or even along the trailing edge means that no missing leading-edge points of secondary peak 221 are used.

In order to confirm the use of just a few points of the primary and secondary ion peaks in the calculation of an ion ratio, this method was compared to the conventional method of using peak areas. A large number of clinical samples were obtained and were analyzed. For each sample, a ratio was calculated using peak areas, using the peak height of each peak, and using the sum of one or more intensities from one or more points across each peak.

Figure 4:
FIG. 4 is an exemplary table showing an average ion ratio and an ion ratio standard deviation for ion ratios calculated for primary and secondary ions of vitamin D for 140 samples using peak areas and using the sum of intensities from 1, 3, 5, and 7 points across each peak, in accordance with various embodiments.

FIG. 4 is an exemplary table 400 showing an average ion ratio and an ion ratio standard deviation for ion ratios calculated for primary and secondary ions of vitamin D for 140 samples using peak areas and using the sum of intensities from 1, 3, 5, and 7 points across each peak, in accordance with various embodiments. Note that peaks with problematic integration were not used in compiling the data for FIG. 4.

FIG. 4 shows that all methods other than using the intensity of a single point have standard deviations that are better than the standard deviation of the conventional method of using peak areas to calculate the ratio. FIG. 4 also shows that increasing the number of points used in the method of using the sum of intensities from points across each peak improves the standard deviation. However, the standard deviation does not significantly improve when increasing the number of points beyond three points. In other words, FIG. 4 shows that using the sum of intensities from just three points provides an average ion ratio compatible with the conventional method of using peak areas and even provides an improvement over this conventional method with respect to standard deviation.

In a second embodiment, an area of a narrow time window within the chromatographic peak of the primary ion is calculated, producing a primary peak value. Similarly, an area of the same narrow time window within the chromatographic peak of the secondary ion is calculated, producing a secondary peak value. The primary ion to secondary ion ratio is then calculated as the primary peak value divided by the secondary peak value.

Figure 5:
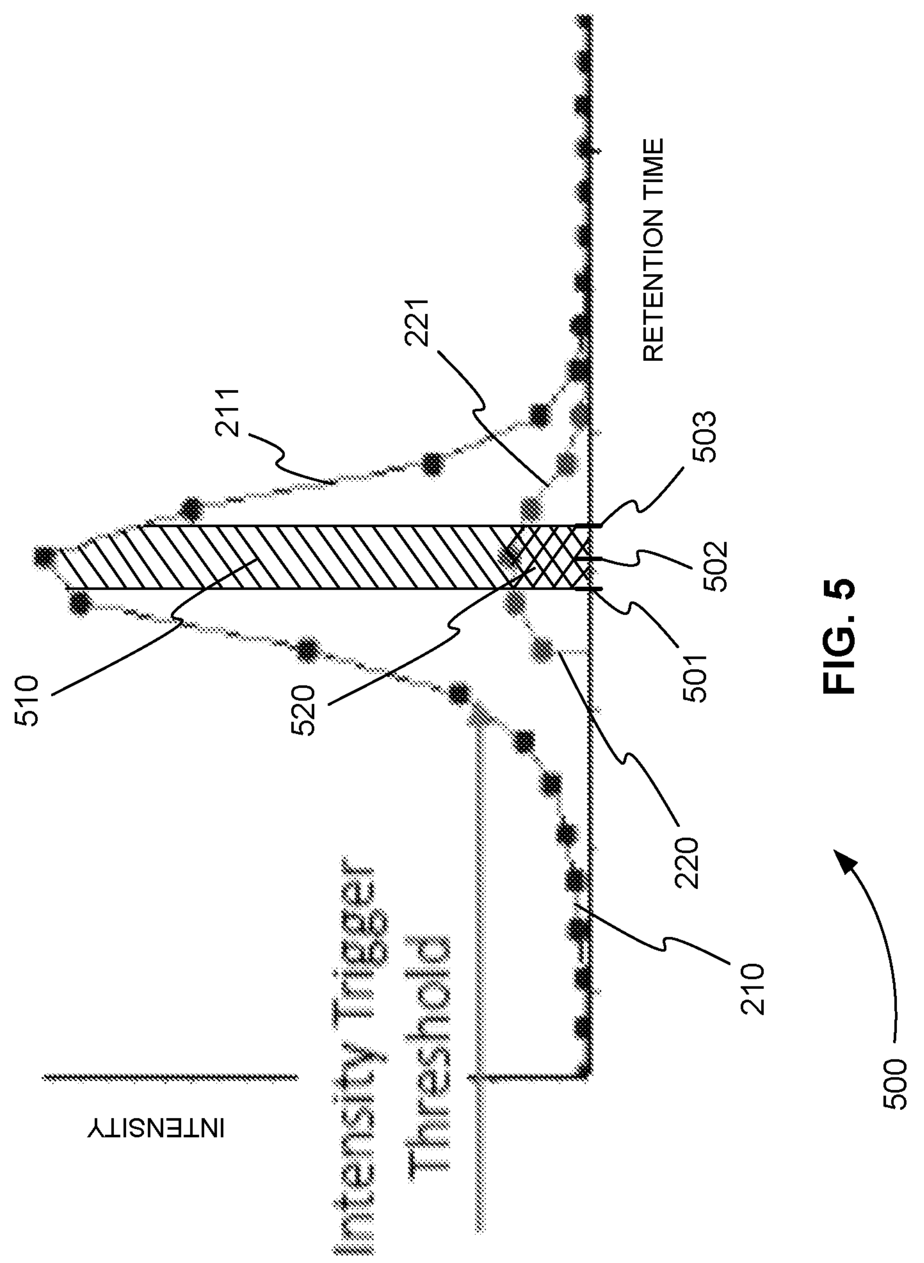
FIG. 5 is an exemplary plot of the XICs of FIG. 2 showing how an ion ratio is calculated using an area of a narrow time window of the primary and secondary ion peaks, in accordance with various embodiments.

FIG. 5 is an exemplary plot 500 of the XICs of FIG. 2 showing how an ion ratio is calculated using an area of a narrow time window of the primary and secondary ion peaks, in accordance with various embodiments. FIG. 5 includes XIC 210 of the primary ion and XIC 220 of the secondary ion. Again, XIC 210 of the primary ion includes primary peak 211, and XIC 220 of the secondary ion includes secondary peak 221. Instead of calculating the ratio of the primary ion to the secondary ion from the areas of primary peak 211 and secondary peak 221, this ratio is calculated using the areas of a narrower time window of each peak.

In a preferred embodiment, the time window is centered at retention time 502 of the apex of primary peak 211. The time window has a width smaller than the width of primary peak 211 and extends from time 501 to time 503, for example. An area 510 of the narrow time window between time 501 and time 503 of primary peak 211 is calculated, producing a primary peak value. Similarly, an area 520 of the same narrow time window between time 501 and time 503 of secondary peak 221 is calculated, producing a secondary peak value. The primary ion to secondary ion ratio is then calculated as the primary peak value divided by the secondary peak value.

As shown in FIG. 5, there is no need to run a peak finding algorithm on secondary XIC 220. There is also no need to manually review or correct and integration of secondary peak 221. Further, FIG. 5 shows that, for the case of MRM-triggered MRM, selecting a narrow time window around the apex or even along the trailing edge means that no missing leading-edge points of secondary peak 221 are used.

FIG. 5 illustrates a general case wherein the time window selects an area within the primary peak 211 and the secondary peak 221. In some embodiments, the time window may be located based on at least one sampling point such that at least one boundary of the time window coincides with a sampling point of the primary peak 211 or the secondary peak 221. In some aspects, a first boundary of the time window may coincide with a sampling point of one of the primary peak 211 and the secondary peak 221 and a second boundary of the time window.

In some embodiments, a width of the time window may include a same number of sampling points for each of the primary peak 211 and the secondary peak 221. In some embodiments, a width of the time window may include a different number of sampling points for each of the primary peak 211 and the secondary peak 221. In the example of FIG. 5, the time window includes a single sampling point from each of the primary peak 211 and the secondary peak 221. In other embodiments, the time window may include additional sampling points from the primary peak 211 and the secondary peak 221. In some embodiments, a width of the time window may be an integral multiple of a sampling interval between sampling points.

System for Calculating Primary to Secondary Peak Ratio

Figure 6:
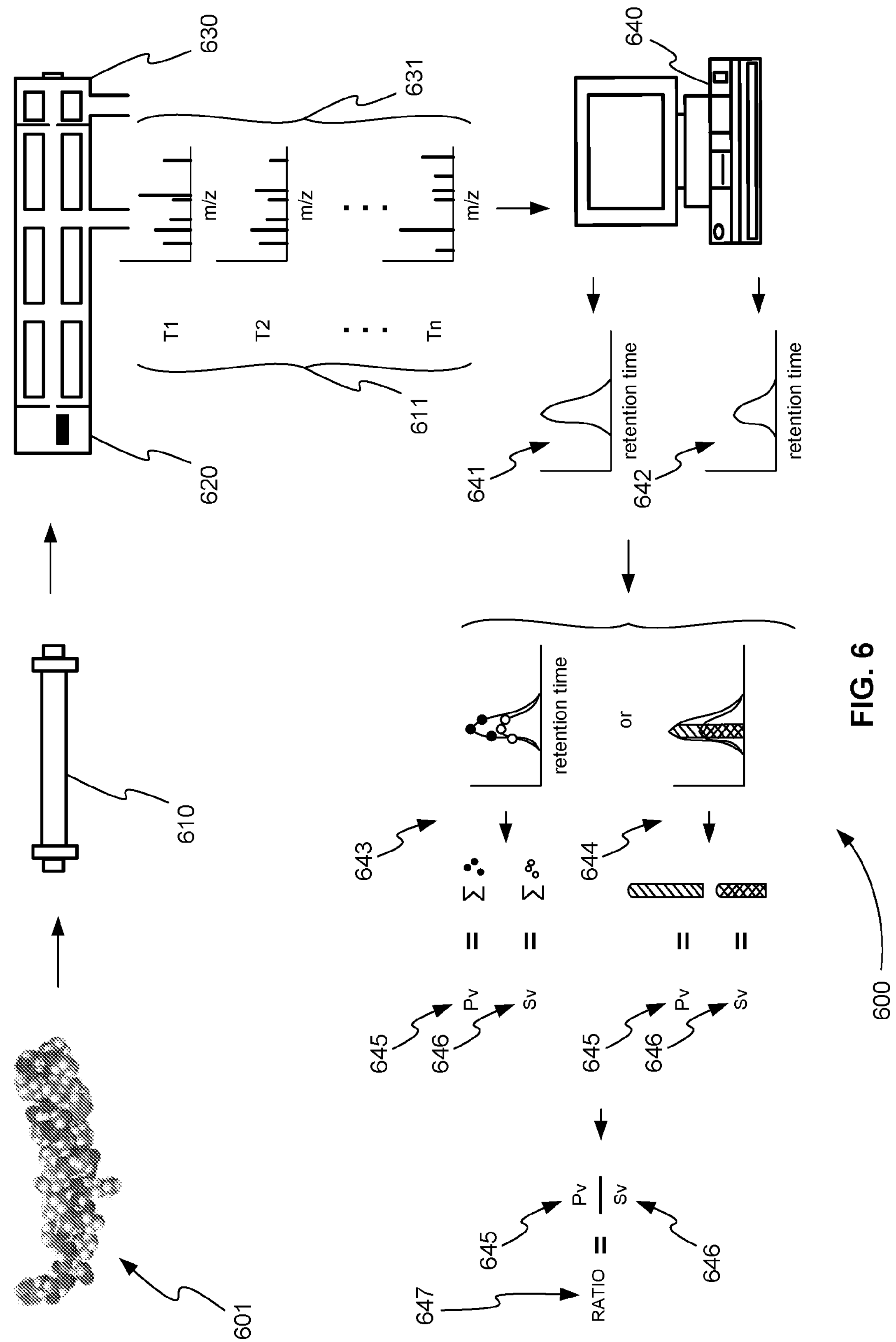
FIG. 6 is a schematic diagram of a system for calculating a ratio of a chromatographic peak of a primary ion of a compound of interest to a chromatographic peak of a secondary ion, in accordance with various embodiments.

FIG. 6 is a schematic diagram 600 of a system for calculating a ratio of a chromatographic peak of a primary ion of a compound of interest to a chromatographic peak of a secondary ion, in accordance with various embodiments. The system includes separation device 610, ion source device 620, mass spectrometer 630, and processor 640.

Separation device 610 separates and fragments or only separates compound of interest 601 from a sample at plurality of different times 611. A gas chromatography (GC) device separates and fragments a compound of interest, while an LC device only separates a compound of interest, for example. Separation device 610 is controlled by processor 640, for example. Separation device 610 is shown as an LC separation device. In various alternative embodiments, a separation device can perform one of a variety of separation techniques that include, but are not limited to, GC, flow injection analysis (FIA), and capillary electrophoresis (CE).

Ion source device 620 ionizes separated fragments of compound 601 or only compound 601, producing an ion beam. Ion source device 620 is controlled by processor 640, for example. Ion source device 620 is shown as a component of mass spectrometer 630. In various alternative embodiments, ion source device 620 is a separate device. Ion source device 620 can be, but is not limited to, an electrospray ion source (ESI) device or a chemical ionization (CI) source device such as an atmospheric pressure chemical ionization source (APCI) device or an atmospheric pressure photoionization (APPI) source device.

Mass spectrometer 630 mass analyzes product ions of compound 601 or selects and fragments compound 601 and mass analyzes product ions of compound 601 from the ion beam at plurality of different times 611. Plurality of mass spectra 631 is produced for compound 601. Mass spectrometer 630 is controlled by processor 640, for example.

In the system of FIG. 6, mass spectrometer 630 is shown as a triple quadrupole device. One of ordinary skill in the art can appreciate that any component of mass spectrometer 630 can include other types of mass spectrometry devices including, but not limited to, ion traps, orbitraps, time-of-flight (TOF) devices, ion mobility devices, or Fourier transform ion cyclotron resonance (FT-ICR) devices.

Processor 640 calculates a primary XIC 641 for a primary product ion of compound 601 and calculates a secondary XIC 642 for a secondary product ion of compound 601 using plurality of mass spectra 631. In method 643, processor 640 calculates a primary value 645 from a combination of intensities of one or more points corresponding to one or more times, but fewer than all of the points, of a primary peak of primary XIC 641 and calculates a secondary value 646 from a combination of intensities of one or more points corresponding to the one or more times of a secondary peak of secondary XIC 642. Or, in method 644, processor 640 calculates primary value 645 as an area of a time window within the primary peak that is less than a peak width of the primary peak and calculates secondary value 646 as an area of the time window within the secondary peak. Processor 640 calculates a ratio 647 from primary value 645 and secondary value 646.

Processor 640 can be a separate device as shown in FIG. 6 or can be a processor or controller of separation device 610 or of mass spectrometer 630. Processor 640 can be, but is not limited to, a controller, a computer, a microprocessor, the computer system of FIG. 1, or any device capable of sending and receiving control signals and data and capable of analyzing data.

In various embodiments, the one or more points of the primary peak include one point and the one or more points of the secondary peak include one point.

In various embodiments, the one or more points of the primary peak include five or fewer points and the one or more points of the secondary peak include five or fewer points.

In various embodiments, the combination of intensities of one or more points of the primary peak includes a sum and the combination of intensities of one or more points of the secondary peak includes a sum.

In various embodiments, the combination of intensities of one or more points of the primary peak includes an average and the combination of intensities of one or more points of the secondary peak includes an average.

In various embodiments, the one or more points of the primary include the apex of the primary peak.

In various embodiments, the one or more points of the primary include only points for times at or after the time of the apex of the primary peak.

In various embodiments, the center of the time window corresponds to a time of a point of the one or more points of the primary peak. The point is, for example, the apex of the primary peak.

In various embodiments, before ratio 647 is calculated, processor 640 subtracts a primary baseline intensity or area value from primary value 645 and subtracts a secondary primary baseline intensity or area value from secondary value 646. The primary baseline intensity or area value is calculated from one or more points of minimum intensity of the primary peak and the secondary baseline intensity or area value is calculated from one or more points of minimum intensity of the secondary peak, for example.

In various embodiments, processor 640 receives the number of the one or more points of the primary peak or a width of the time window within the primary peak as input from a user.

In various embodiments, processor 640 automatically calculates the number of the one or more points of the primary peak or a width of the time window within the primary peak based on a width of the primary peak.

Method for Calculating Primary to Secondary Peak Ratio

FIG. 7 is a flowchart 700 showing a method for calculating a ratio of a chromatographic peak of a primary ion of a compound of interest to a chromatographic peak of a secondary ion, in accordance with various embodiments.

In step 710 of method 700, a compound of interest is separated and fragmented or only separated from a sample at a plurality of different times using a separation device.

In step 720, separated fragments of the compound are ionized or only the compound is ionized using an ion source device, producing an ion beam.

In step 730, the compound is selected and mass analyzed from the ion beam or the compound is selected and fragmented from the ion beam and product ions of the compound are analyzed at the plurality of different times using a mass spectrometer, producing a plurality of mass spectra for the compound.

In step 740, a primary XIC is calculated for a primary product ion of the compound and a secondary XIC is calculated for a secondary product ion of the compound from the plurality of mass spectra using a processor.

In step 750, a primary value is calculated from a combination of intensities of one or more points corresponding to one or more times, but fewer than all of the points, of a primary peak of the primary XIC and a secondary value is calculated from a combination of intensities of one or more points corresponding to the one or more times of a secondary peak of the secondary XIC using the processor. Or, the primary value is calculated as an area of a time window within the primary peak that is less than a peak width of the primary peak and the secondary value is calculated as an area of the time window within the secondary peak using the processor.

In step 760, a ratio is calculated from the primary value and the secondary value using the processor.

Computer Program Product for Calculating Primary to Secondary Peak Ratio

In various embodiments, computer program products include a tangible computer-readable storage medium whose contents include a program with instructions being executed on a processor so as to perform a method for calculating a ratio of a chromatographic peak of a primary ion of a compound of interest to a chromatographic peak of a secondary ion. This method is performed by a system that includes one or more distinct software modules.

Figure 8:
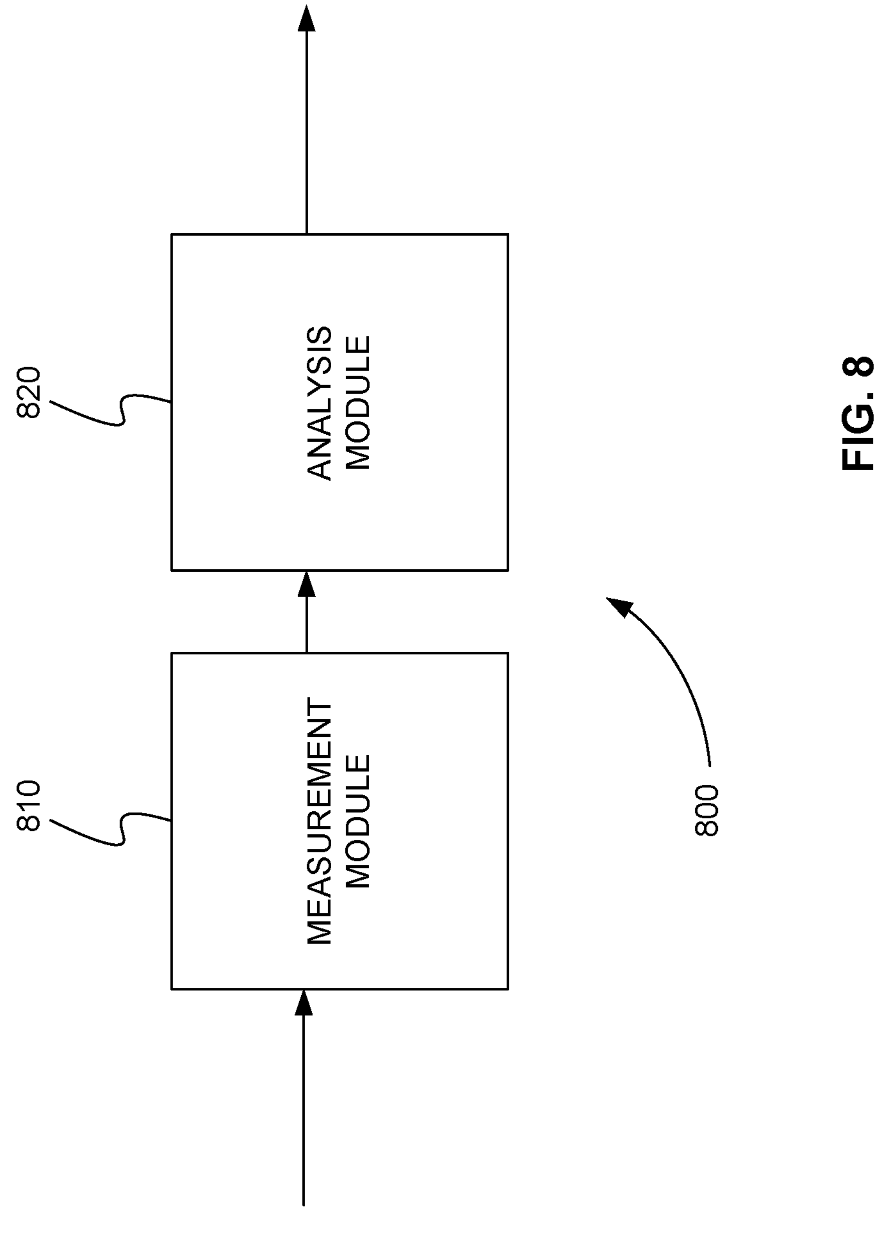
FIG. 8 is a schematic diagram of a system that includes one or more distinct software modules that perform a method for calculating a ratio of a chromatographic peak of a primary ion of a compound of interest to a chromatographic peak of a secondary ion, in accordance with various embodiments.

FIG. 8 is a schematic diagram of a system 800 that includes one or more distinct software modules that perform a method for calculating a ratio of a chromatographic peak of a primary ion of a compound of interest to a chromatographic peak of a secondary ion, in accordance with various embodiments. System 800 includes a measurement module 810 and an analysis module 820.

Measurement module 810 instructs a separation device to separate and fragment or only separate a compound of interest from a sample at a plurality of different times. Measurement module 810 instructs an ion source device to ionize separated fragments of the compound or only the compound, producing an ion beam. Measurement module 810 instructs a mass spectrometer to mass analyze product ions of the compound or select and fragment the compound and mass analyze product ions of the compound from the ion beam at the plurality of different times, producing a plurality of mass spectra.

Analysis module 820 calculates a primary XIC for a primary product ion of the compound and calculates a secondary XIC for a secondary product ion of the compound from the plurality of mass spectra. Analysis module 820 calculates a primary value from a combination of intensities of one or more points corresponding to one or more times, but fewer than all of the points, of a primary peak of the primary XIC and calculates a secondary value from a combination of intensities of one or more points corresponding to the one or more times of a secondary peak of the secondary XIC. Or, analysis module 820 calculates the primary value as an area of a time window within the primary peak that is less than a peak width of the primary peak and calculates the secondary value as an area of the time window within the secondary peak. Analysis module 820 calculates a ratio from the primary value and the secondary value using the analysis module.

While the present teachings are described in conjunction with various embodiments, it is not intended that the present teachings be limited to such embodiments. On the contrary, the present teachings encompass various alternatives, modifications, and equivalents, as will be appreciated by those of skill in the art.

Further, in describing various embodiments, the specification may have presented a method and/or process as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process should not be limited to the performance of their steps in the order written, and one skilled in the art can readily appreciate that the sequences may be varied and still remain within the spirit and scope of the various embodiments.

What is claimed is:

1. A system for calculating a ratio of a chromatographic peak of a primary ion of a compound of interest to a chromatographic peak of a secondary ion, the system comprising:

a separation device that separates and fragments or only separates the compound of interest from a sample at a plurality of different times;

an ion source device that ionizes separated fragments of the compound of interest or only the compound of interest, producing an ion beam;

a mass spectrometer that mass analyzes product ions of the compound of interest, or selects and fragments the compound of interest and mass analyzes the product ions of the compound of interest from the ion beam at the plurality of different times, producing a plurality of mass spectra; and a processor that:

calculates a primary extracted ion chromatogram (XIC) for a primary product ion of the compound of interest, and calculates a secondary XIC for a secondary product ion of the compound of interest using the plurality of mass spectra, calculates a primary value from an intensity of one point corresponding to one time or a combination of intensities of two or more points corresponding to two or more times, but fewer than all points, of a primary peak of the primary XIC and calculates a secondary value from an intensity of one point corresponding to the one time or a combination of intensities of two or more points corresponding to the two or more times of a secondary peak of the secondary XIC, or calculates the primary value as an area of a time window within the primary peak that is less than a peak width of the primary peak and calculates the secondary value as an area of the time window within the secondary peak, wherein the secondary XIC is free of a peak finding algorithm, and calculates the ratio from the primary value and the secondary value.

2. The system of claim 1, wherein the primary peak comprises a first point, and the secondary peak comprises a second point.

3. The system of claim 1, wherein the two or more points of the primary peak comprise five or fewer points, and the two or more points of the secondary peak comprise five or fewer points.

4. The system of claim 1, wherein the combination of intensities of the two or more points of the primary peak comprises a sum, and the combination of intensities of the two or more points of the secondary peak comprises a sum.

5. The system of claim 1, wherein the combination of intensities of the two or more points of the primary peak comprises an average, and the combination of intensities of the two or more points of the secondary peak comprises an average.

6. The system of claim 1, wherein the one point or the two or more points of the primary peak comprise an apex of the primary peak.

7. The system of claim 1, wherein the one point or the two or more points of the primary peak comprise only points for times at or after a time of an apex of the primary peak.

8. The system of claim 1, wherein a center of the time window corresponds to a time of a point of the one point or the two or more points of the primary peak.

9. The system of claim 8, wherein the point comprises an apex of the primary peak.

10. The system of claim 1, wherein a boundary of the time window coincides with a point of at least one of the product ions.

11. The system of claim 1, wherein a width of the time window comprises an integer multiple of a sampling interval.

12. The system of claim 1, wherein a width of the time window comprises a same number of points for each of the product ions.

13. The system of claim 1, wherein, before the ratio is calculated, the processor subtracts a primary baseline intensity or area value from the primary value, and subtracts a secondary primary baseline intensity or area value from the secondary value.

14. The system of claim 13, wherein the primary baseline intensity or area value is calculated from one or more points of minimum intensity of the primary peak, and the secondary baseline intensity or area value is calculated from one or more points of minimum intensity of the secondary peak.

15. The system of claim 1, wherein the processor receives a number of the one point or the two or more points of the primary peak or a width of the time window within the primary peak as input from a user.

16. The system of claim 1, wherein the processor automatically calculates a number of the one point or the two or more points of the primary peak or a width of the time window within the primary peak based on a width of the primary peak.

17. The system of claim 1, wherein the primary ion comprises a highest intensity product ion.

18. The system of claim 1, wherein the secondary ion comprises a plurality of different secondary ions, and wherein the system is operative to calculate a plurality of ion ratios based on at least the plurality of different secondary ions.

19. A method for calculating a ratio of a chromatographic peak of a primary ion of a compound of interest to a chromatographic peak of a secondary ion, the method comprising:

separating and fragmenting or only separating the compound of interest from a sample at a plurality of different times using a separation device;

ionizing separated fragments of the compound of interest or only the compound of interest using an ion source device, producing an ion beam;

mass analyzing product ions of the compound of interest or selecting and fragmenting the compound of interest and mass analyzing the product ions of the compound of interest from the ion beam at the plurality of different times using a mass spectrometer, producing a plurality of mass spectra calculating a primary extracted ion chromatogram (XIC) for a primary product ion of the compound of interest and calculating a secondary XIC for a secondary product ion of the compound of interest from the plurality of mass spectra using a processor;

calculating a primary value from an intensity of one point corresponding to one time or a combination of intensities of two or more points corresponding to two or more times, but fewer than all points, of a primary peak of the primary XIC and calculating a secondary value from an intensity of one point corresponding to the one time or a combination of intensities of two or more points corresponding to the two or more times of a secondary peak of the secondary XIC using the processor, or calculating the primary value as an area of a time window within the primary peak that is less than a peak width of the primary peak and calculating the secondary value as an area of the time window within the secondary peak using the processor, wherein the secondary XIC is free of a peak finding algorithm; and calculating the ratio from the primary value and the secondary value using the processor.

20. A computer program product comprising a non-transitory and tangible computer-readable storage medium including a program with instructions being executed on a processor to perform a method for identifying a ratio of a chromatographic peak of a primary ion of a compound of interest to a chromatographic peak of a secondary ion, the method comprising:

providing a system, wherein the system comprises one or more distinct software modules, and wherein the one or more distinct software modules comprise a measurement module and an analysis module provide appropriate antecedence basis;

instructing a separation device to separate and fragment, or only separate the compound of interest from a sample at a plurality of different times using the measurement module;

instructing an ion source device to ionize separated fragments of the compound of interest, or only the compound of interest using the measurement module, producing an ion beam;

instructing a mass spectrometer to mass analyze product ions of the compound of interest or select and fragment the compound of interest and mass analyze the product ions of the compound of interest from the ion beam at the plurality of different times using the measurement module, producing a plurality of mass spectra;

calculating a primary extracted ion chromatogram (XIC) for a primary product ion of the compound of interest, and calculating a secondary XIC for a secondary product ion of the compound of interest from the plurality of mass spectra using the analysis module;

calculating a primary value from an intensity of one point corresponding to one time or a combination of intensities of two or more points corresponding to two or more times, but fewer than all points, of a primary peak of the primary XIC and calculating a secondary value from an intensity of one point corresponding to the one time or a combination of intensities of two or more points corresponding to the two or more times of a secondary peak of the secondary XIC using the analysis module, or calculating the primary value as an area of a time window within the primary peak that is less than a peak width of the primary peak and calculating the secondary value as an area of the time window within the secondary peak using the analysis module, wherein the secondary XIC is free of a peak finding algorithm; and calculating a ratio from the primary value and the secondary value using the analysis module.

* * * * *